US009880273B2

(12) United States Patent
Matsuura et al.

(10) Patent No.: US 9,880,273 B2
(45) Date of Patent: Jan. 30, 2018

(54) OBJECT DETECTION APPARATUS AND OBJECT DETECTION SYSTEM (71) Applicant: DENSO CORPORATION, Kariya, Aichi-pref. (JP)

(72) Inventors: Mitsuyasu Matsuura, Nishio (JP); Keiko Akiyama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/022,166

(22) PCT Filed: Sep. 3, 2014

(86) PCT No.: PCT/JP2014/004533
§ 371 (c)(1),
(2) Date: Mar. 15, 2016

(87) PCT Pub. No.: WO2015/040815
PCT Pub. Date: Mar. 26, 2015

(65) Prior Publication Data
US 2016/0238700 A1 Aug. 18, 2016

(30) Foreign Application Priority Data

Sep. 17, 2013 (JP) .................. 2013-192176

(51) Int. Cl.
G01S 13/93 (2006.01)
G01S 7/52 (2006.01)
(Continued)

(52) U.S. Cl.
CPC .......... *G01S 7/5276* (2013.01); *B60W 30/08* (2013.01); *B60W 40/02* (2013.01);
(Continued)

(58) Field of Classification Search
CPC .............. H03K 17/954; H03K 17/955; H03K 2217/94026; B60R 2021/0006;
(Continued)

(56) References Cited

U.S. PATENT DOCUMENTS 4,383,238 A * 5/1983 Endo ..................... G01S 17/936
340/901
6,398,191 B1 * 6/2002 Forsberg .................. H05C 1/06
256/10
(Continued)

FOREIGN PATENT DOCUMENTS

JP S60-98375 A 6/1985
JP H09-15332 A 1/1997
(Continued)

OTHER PUBLICATIONS

ISR and Written Opinion Issued in PCT/JP2014/004533, dated Dec. 16, 2014.

*Primary Examiner* — Fekadeselassie Girma
(74) *Attorney, Agent, or Firm* — Knobbe, Martens, Olson & Bear, LLP (57) ABSTRACT An object detection apparatus mounted to a vehicle includes a transmitter, a receiver, a filter, a threshold calculator, and an object determinator. The transmitter transmits a probe wave in pulse form. The receiver receives a reflected wave of the probe wave. The filter passes, among the received reflected wave, only frequencies that are at least smaller than a pulse frequency of the probe wave. Based on an output of the filter, the threshold calculator calculates an objection determination threshold for determining presence and absence of an object. The object determinator determines the presence and absence of the object by using the objection determination threshold calculated by the threshold calculator.

13 Claims, 6 Drawing Sheets (51) Int. Cl.
*G01S 7/527* (2006.01)
*G01S 15/93* (2006.01)
*B60W 30/08* (2012.01)
*B60W 40/02* (2006.01)
*G01S 15/04* (2006.01)
*G01V 3/12* (2006.01)
*G01S 7/539* (2006.01)
*G01S 15/87* (2006.01)

(52) U.S. Cl.
CPC .......... *G01S 7/52004* (2013.01); *G01S 15/04* (2013.01); *G01S 15/931* (2013.01); *G01S 7/52001* (2013.01); *G01S 7/539* (2013.01); *G01S 15/876* (2013.01); *G01S 2007/52012* (2013.01); *G01S 2013/9353* (2013.01); *G01V 3/12* (2013.01)

(58) Field of Classification Search
CPC .......... B60R 21/0132; B60R 21/01336; F02G 2275/20; G01B 7/023; G01N 33/0031; G01R 23/10; G01S 15/42; G01S 15/931; G01S 17/936; G01S 3/808; G01S 7/52004; G05D 1/0246; G06K 9/00805; G06K 9/3233; G06T 2207/30261; G06T 7/12; G08G 5/045
See application file for complete search history.

(56) References Cited

U.S. PATENT DOCUMENTS

| | | | | |
|---|---|---|---|---|
| 2002/0167439 A1* | 11/2002 | Bloch | ............. | G01D 5/2013 342/28 |
| 2002/0189433 A1* | 12/2002 | Unger | ............. | F02B 71/00 91/361 |
| 2005/0143960 A1* | 6/2005 | Recknagel | ......... | B60R 21/0132 702/190 |
| 2008/0122458 A1* | 5/2008 | Lenz | ............. | H03K 17/955 324/687 |
| 2009/0168603 A1* | 7/2009 | Okuda | ............. | B06B 1/0629 367/87 |
| 2011/0050883 A1* | 3/2011 | Ghose | ............. | G05D 1/0246 348/113 |
| 2011/0057668 A1* | 3/2011 | Chen | ............. | G01B 7/023 324/655 |
| 2011/0082656 A1* | 4/2011 | Todorokihara | ......... | G01R 23/10 702/78 |
| 2013/0270899 A1* | 10/2013 | Buttolo | ............. | H03K 17/955 307/9.1 |
| 2013/0271182 A1* | 10/2013 | Buttolo | ............. | H03K 5/153 327/14 |
| 2013/0301391 A1 | 11/2013 | Altman et al. | | |
| 2015/0229305 A1* | 8/2015 | Buttolo | ............. | H03K 17/945 307/9.1 |
| 2016/0125746 A1* | 5/2016 | Kunzi | ............. | G05D 1/0088 701/11 |

FOREIGN PATENT DOCUMENTS

| | | |
|---|---|---|
| JP | H11-45396 A | 2/1999 |
| JP | 2001-21646 A | 1/2001 |
| JP | 2003-57345 A | 2/2003 |
| JP | 2009-210382 A | 9/2009 |
| JP | 2010-139330 A | 6/2010 |
| JP | 2011-112416 A | 6/2011 |
| JP | 2013-160634 A | 8/2013 |
| WO | 2015/040815 A1 | 3/2015 |

* cited by examiner

OBJECT DETECTION APPARATUS AND OBJECT DETECTION SYSTEM

CROSS REFERENCE TO RELATED APPLICATION

This application is based on Japanese Patent Application No. 2013-192176 filed on Sep. 17, 2013, the disclosure of which is incorporated herein by reference.

TECHNICAL FIELD

The present disclosure relates to an object detection apparatus and an object detection system for detecting an object.

BACKGROUND ART

A known object detection apparatus transmits and receives pulse probe wave such as ultrasonic wave and electromagnetic wave to detect an object existing in a probe wave illumination range. Because of directionality of the probe wave, when the probe wave is transmitted in a horizontal direction, the received reflected wave may contain noise resulting from road surface reflection.

A technology for addressing this problem is disclosed in, for example, Patent Literature 1. The technology is provided with an onboard camera for imaging a road surface and determines a threshold for noise removal in accordance with a road surface condition determined by the captured image and removes the noise.

PRIOR ART LITERATURES

Patent Literature

Patent Literature 1: JP 2011-112416A

SUMMARY OF INVENTION

However, the technology disclosed in Patent Literature 1 requires a camera for imaging a road surface, which leads to high cost.

It is conceivable to set a threshold for noise removal by assuming a worst condition. This requires a large margin relative to an appropriate threshold and reduces object detection performance.

In view of the foregoing, it is an object of the present disclosure to provide an object detection apparatus and an object detection system that can suppress an influence of road surface reflection noise on object detection while suppressing a cost increase and a detection performance decrease.

An object detection apparatus in an example of the present disclosure is mounted to a vehicle and comprises: a transmitter that transmits a probe wave in pulse form; a receiver that receives a reflected wave of the probe wave; a filter that passes, among the received reflected wave, only frequencies that are at least smaller than a pulse frequency of the probe wave; a threshold calculator that, based on an output of the filter, calculates an objection determination threshold for determining presence and absence of an object; and an object determinator that determines the presence and absence of the object by using the objection determination threshold calculated by the threshold calculator.

The same single probe wave provides multiple pieces of the reflected wave because road surface roughness causes a time difference in reflection. Thus, a waveform outputted from the filter is gentle as compared with the reflected wave from an object to be detected, and has a lower apparent frequency. Thus, when the object determination threshold is calculated based on the filter that passes only frequencies smaller than or equal to a predetermined value, the object determination threshold adapted to a road surface condition can be calculated. Because the object detection apparatus in the present disclosure can determine presence and absence of an object by using the object determination threshold adapted to the road surface condition, the object detection apparatus can detect an object without being influenced by a noise resulting from a road surface, while suppressing a detection performance decrease.

Moreover, the object determination threshold is calculated based on the output of the filter to which the reflected wave received by the receiver is inputted. Thus, this calculation of the object determination threshold does not require an onboard camera that images a road surface. The cost for calculating the object determination threshold can be reduced. As a result, it becomes possible to suppress an influence of road surface reflection noise on object detection while suppressing a cost increase and a detection performance decrease.

An object detection system in the present disclosure includes the above-mentioned object detection apparatus. Thus, it becomes possible to suppress an influence of road surface reflection noise on object detection while suppressing a cost increase and a detection performance decrease.

EMBODIMENTS FOR CARRYING OUT INVENTION

Embodiments of the present disclosure will be illustrated below with reference to the drawings.

First Embodiment

Figure 1:
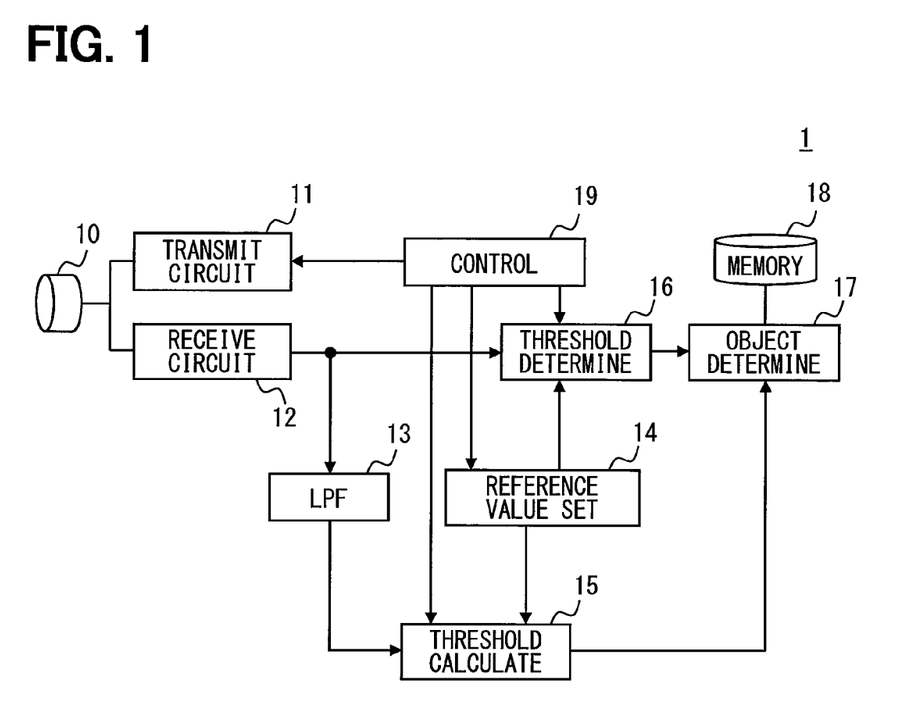
FIG. 1 is a block diagram illustrating a schematic configuration of an object detection apparatus 1 according to a first embodiment.

FIG. 1 is a block diagram illustrating a schematic configuration of an object detection apparatus 1 according to a first embodiment. The object detection apparatus 1 illustrated in FIG. 1 is mounted to a vehicle and detects an object that could be an obstacle of the vehicle. As shown in FIG. 1, the object detection apparatus 1 includes a transceiver 10, a transmitting circuit 11, a receiving circuit 12, a low pass filter (LPF) 13, a reference value setting part 14, a threshold calculation part 15, a threshold determination part 16, an object determination part 17, a memory 18, and a controller 19.

The transmitting circuit 11 transmits the probe wave in pulse form with the transceiver 10 in accordance with instructions from the controller 19. For example, the transmitting circuit 11 oscillates the transceiver 10 sixteen times at 40 kHz, thereby forming a single pulse. The transmitting circuit 11 corresponds to an example of transmitter. Via the transceiver 10, the receiving circuit 12 receives a reflected wave of the probe wave transmitted from the transceiver 10, and outputs it to the LPF 13 and the threshold determination part 16. The receiving circuit 12 corresponds to an example of a receiver. Although the probe wave in pulse form may be radio wave or ultrasonic wave, the following description in the present embodiment is given for an exemplary case of the ultrasonic wave.

Although the transceiver 10 may be disposed at any places such as a vehicle front part and a vehicle rear part, the following description in the present embodiment is given for an exemplary case in which the transceiver is disposed at a vehicle rear part to detect an object in rear of the vehicle.

The LPF 13 is a low pass filter and passes, among the output from the receiving circuit 12, frequencies smaller than or equal to a predetermined value, and outputs it to the threshold calculation part 15. The LPF 13 corresponds to a filter. The frequencies smaller than or equal to the predetermined value refers to the frequencies at least smaller than a pulse frequency of the transmitted probe wave, and for example, are frequencies smaller than or equal to one third of the pulse frequency of the transmitted probe wave.

The same single probe wave provides multiple pieces of the reflected wave because road surface roughness causes a time difference in reflection. Thus, the output after passage through the LPF 13 is gentle as compared with the reflected wave from an object to be detected, and has a lower apparent frequency. Thus, the waveform of the reflected wave generated by the road surface reflection (also called hereinafter a road surface waveform) can be traced with the LPF 13. In particular, when only the frequencies smaller than or equal to one third of the pulse frequency passes through the LPF 13, the road surface waveform can be more accurately traced with the LPF 13.

The reference value setting part 14 sets a reference value used in the threshold calculation part 15 and the threshold determination part 16. The reference value employed is the output of the LPF 13 prior to the transmission of the probe wave from the transceiver 10, that is, the reference value employed is a dark noise level. The output of the LPF 13 prior to the transmission of the probe wave from the transceiver 10 may be obtained by prohibiting the transceiver 10 from transmitting the probe wave.

Alternatively, the reference value may be pre-stored at a time of manufacturing the object detection apparatus 1 or the like. The reference value may be obtained by the object detection apparatus 1 after the object detection apparatus 1 is mounted to a vehicle. In cases where the object detection apparatus 1 obtains the reference value, the object detection apparatus 1 may be configured such that the controller 19 prohibits the transmission of the probe wave and obtains the output of the LPF 13 as the reference value during non-transmission of the probe wave.

Figure 2:
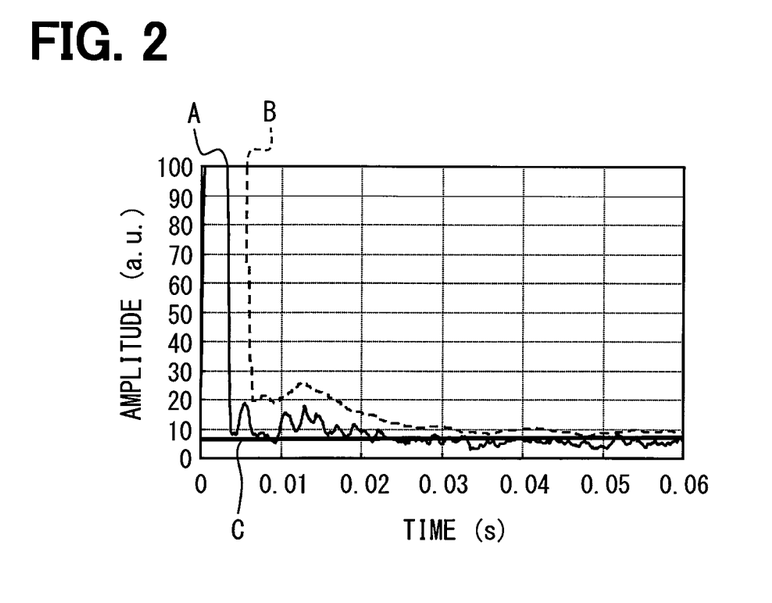
FIG. 2 is a diagram illustrating an object determination threshold.
Figure 3:
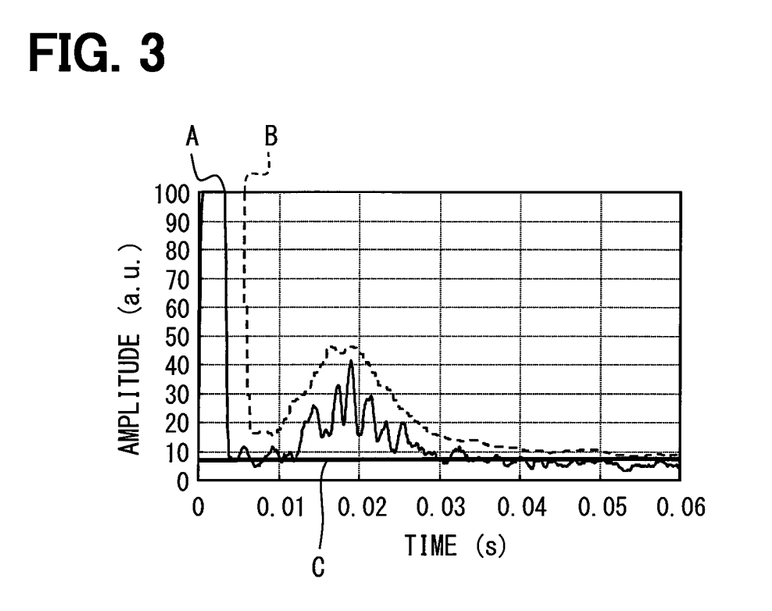
FIG. 3 is another diagram illustrating an object determination threshold.

The threshold calculation part 15 calculates an object determination threshold for determining presence and absence of an object which is a detection target. As illustrated in FIG. 2 and FIG. 3, the object determination threshold (see the dashed line B in the drawings) is calculated by adding the reference value set by the reference value setting part 14 (see the solid line C in the drawings) to the output of the LPF 13 (see the solid line A in the drawings). In FIG. 2 and FIG. 3, the vertical axis denotes amplitude and the horizontal axis denotes time. The threshold calculation part 15 outputs the calculated object determination threshold to the object determination part 17.

The threshold calculation part 15 may be configured to reference, for example, a map or a table showing a relationship between outputs of the LPF 13 and values to be added to the reference value, calculate the value to be added to the reference value based on the output of the LPF 13, and add the calculated value to the reference value, thereby calculating the object determination threshold (also referred to hereinafter as a first modification).

Alternatively, by referencing, for example, a map or a table showing a relationship between outputs of the LPF 13 and object determination thresholds, the threshold calculation part 15 calculates the object determination threshold based on the output of the LPT part 13 (also referred to hereinafter as a second modification).

The map, the table or the like in the first modification and the second modification may be pre-stored in a memory (not shown) and read out and used. In the map, the table or the like in the first modification and the second modification, the outputs of the LPF 13 are pre-associated with multiple values so that the larger the output of the LPF 13, the larger the value, and that the smaller the output of the LPF 13, the smaller the value.

The threshold determination part 16 provisionally determines the presence and absence of the object serving as the detection target by not using the above-mentioned object determination threshold but using the reference value set by the reference value setting part 14. For example, when the output from the receiving circuit 12 is larger than the reference value, the presence of the object is provisionally determined. When the output from the receiving circuit 12 is smaller than or equal to the reference value, the absence of the object is provisionally determined. When the presence of the object is provisionally determined, a time when the provisional determination is made (also referred to hereinafter as a provisional detection time) and a peak value of the output from the receiving circuit 12 are sent to the object determination part 17. The time when the provisional determination is made may be a clock time, or a time counted by a timer circuit relative to a certain time point.

The provisional detection time and the peak value transmitted from the threshold determination part 16 are associated with each other and stored in the memory 18 by the object determination part 17. The object determination part 17 determines the presence and absence of the object serving as the detection target, based on the object determination threshold outputted from the threshold calculation part 15 and the peak value at the provisional detection, wherein the provisional detection was made based on the output of the LPT part 13 which was used in calculating the object determination threshold. For example, the object determination part 17 compares the object determination threshold with the peak value, determines the presence of the object when the peak value is larger than the object determination threshold, and determines the absence of the object when the peak value is smaller than or equal to the object determination threshold.

For example, the object determination threshold used for determining the presence and absence of the object may be associated with the peak value in the following way. A delay time caused by processing of the threshold calculation part 15 and the LPF 13 is obtained in advance and stored in the memory 18. A provisional detection time corresponding to a time point obtained by going back by the delay time from time when the object determination threshold is outputted from the threshold calculation part 15 to the object determination part 17 is obtained. The peak value associated with the obtained provisional detection time is read out from the memory 18 and used to determine the presence and absence of the object.

In the above configuration, after the delay time caused by processing of the threshold calculation part 15 and the LPF 13 is adjusted, the presence and absence of the object can be determined using the object determination threshold. Furthermore, when the provisional detection is not made, the provisional detection time and the peak value are not stored in the memory 18. Thus, it is possible to eliminate waste as compared with a configuration that, without exception, stores the output of the LPF 13 in the memory 18 for a constant time period without performing the provisional determination.

In the present embodiment, the threshold determination part 16 provisionally determines the presence and absence of the object. However, configurations are not limited to this example. For example, the threshold determination part 16 may not make the provisional determination as to the presence and absence of the object. In this case, the output of the LPF 13 may be stored in the memory 18 for a constant time period without exception. The output of the LPF 13 tracing back by the delay time is read out and used to determine the presence and absence of the object.

Now, with reference to the flow chart of FIG. 4, explanation will be given on exemplary processing which is related to object detection in the object detection apparatus 1 (also referred to hereinafter as object detection-related processing). For example, the object detection apparatus 1 may start the flow of FIG. 4 upon detecting that the vehicle starts backing. Based on a signal of a shift position sensor indicating that a gear shift position is placed in a back position, the object detection apparatus 1 may detect that the vehicle starts backing. Alternatively, in response to the power on of the object detection apparatus 1, the flow of FIG. 4 may start.

At step S1, in accordance with an instruction from the controller 19, the transmitting circuit 11 transmits a probe wave in a pulse form via the transceiver 10, and the receiving circuit 12 receives a reflected wave of the probe wave via the transceiver 10. Then, the processing proceeds to step S2 and step S3. The step S2 and step S3 are performed parallel.

At step S2, the threshold determination part 16 performs provisional detection of an object by provisionally determining a presence and absence of an object serving as a detection target by using the reference value. The object determination part 18 stores, in the memory 18, the provisional detection time and the peak value at the time of the provisional detection, which are transmitted from the threshold determination part 16. Then the processing proceeds to step S5.

At step S3 performed in parallel with step S2, the LPF 13 passes, among the output of the receiving circuit 12, only the frequencies smaller than the predetermined value, and thereby traces the road surface waveform. Then the processing proceeds to step S4. At step S4, the threshold calculation part 15 adds the reference value to the output of the LPF 13, thereby calculating the object determination threshold. Then the processing proceeds to step S5.

At step S5, the object determination part 17 makes a comparison between the object determination threshold outputted from the threshold calculation part 15 and the peak value at the time of the provisional detection that had used the output of the LPF 13 in calculating this object determination threshold. When the peak value is larger than the object determination threshold (YES at step S5), the processing proceeds to step S6. When the peak value is smaller than or equal to the object determination threshold (NO at step S5), it is determined that the object is absence, and the processing proceeds to step S7.

At step S6, the object determination part 17 determines the presence of the object, and the processing proceeds to step S7. For example, when the object determination part 17 determines the presence of the object, this determination result may be transmitted to a driving assist ECU and may be used for the driving assist ECU to perform the driving assistance. The driving assist ECU is an ECU for driving assistance. Examples of the driving assistance include notifying presence of an obstacle around the vehicle by speech or display.

When now is a time to end the object detection-related processing at step S7 (YES at step S7), the flow is ended. When now is not the time to end the object detection-related processing (NO at step S7), the flow is repeated by returning to step S1. Examples of the time to end the object detection-related processing include placing the gear shift position into positions other than the back position, and the power off of the object detection apparatus 1.

Figure 4:
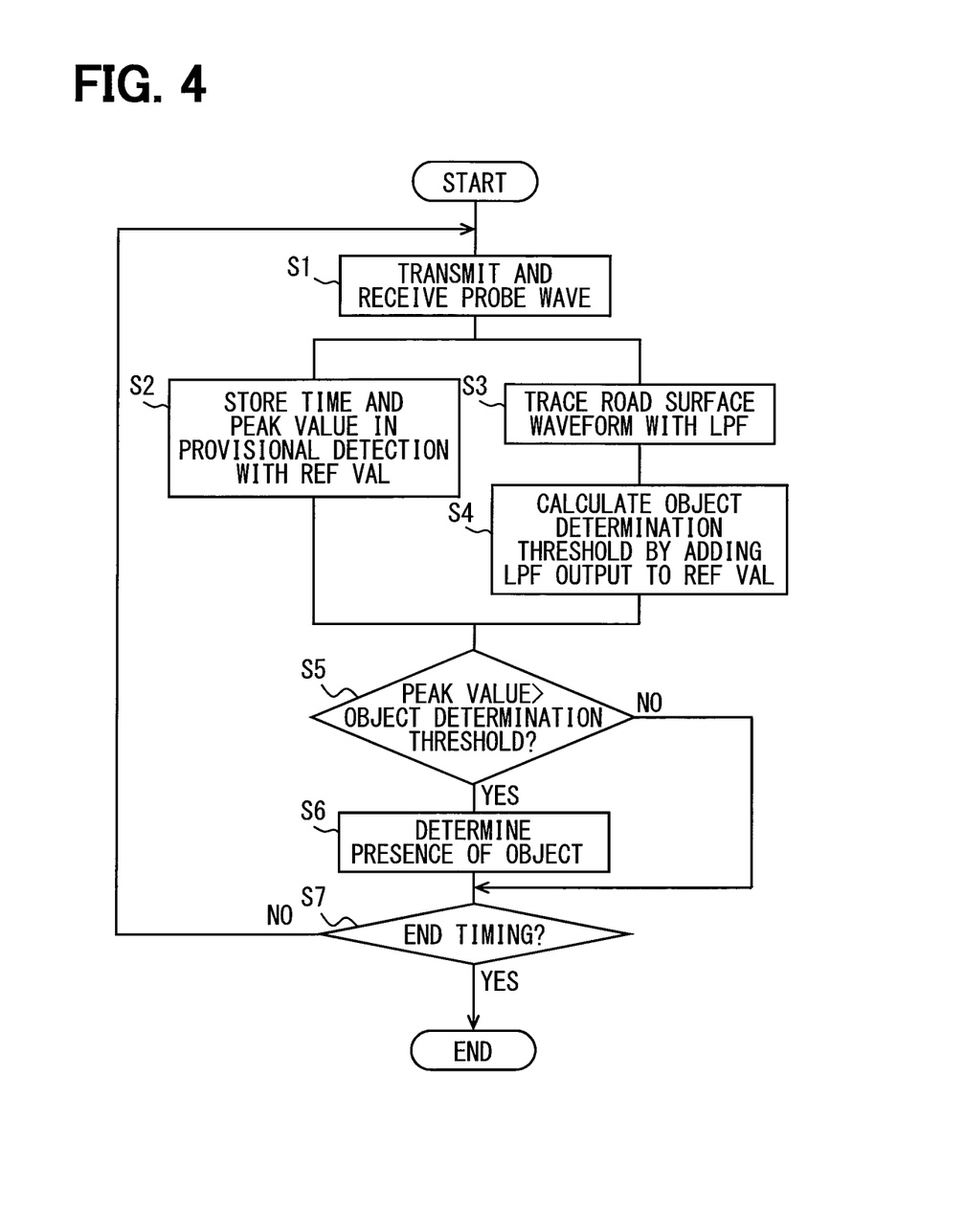
FIG. 4 is a flowchart illustrating an object detection-related processing flow in an object detection apparatus.

The flow of FIG. 4 has been described on assumption that the object is provisionally detected. However, when the object is not provisionally detected, the absence of the object may be determined at step S6. Alternatively, the controller 19 may not operate the LPF and the processing may proceed to step S7, so that the steps S3 to S6 are not performed.

The controller 19 performs various controls including causing the transmitting circuit 11 to perform the transmission. For example, when the controller 19 causes the transmitting circuit 11 to transmit the probe wave from the transceiver 10, the controller 19 controls the LPF 13 such that the LPF 13 is prohibited from operating until elapse of a delay time of cross talk signal of this probe wave transmission, and that the LPF 13 is started to operate after the elapse of the delay time. In the case of ultrasonic wave, the LPF 13 is controlled such that until elapse of the reverberation time of the transceiver 10, the LPF 13 is prohibited from operating, and that after the elapse of the reverberation time, the LPF 13 is started to operate. Therefore, the controller 19 corresponds to an example of an operation controller.

For example, the reverberation time in cases where the probe wave is transmitted from the transceiver 10 is obtained and stored in the memory 18 or the like in advance. After the transmission of the probe wave, the LPF 13 is prohibited from operating for the stored reverberation time. In the above configuration, it is possible to determine the presence and absence of an object without being influenced by noise resulting from the reverberation of the probe wave.

In the configuration of the first embodiment, the output of the LPF 13, which accurately traces the road surface waveform, is added to the dark noise level to obtain the object determination threshold. Thus, the object determination part 17 can accurately determine the presence and absence of the object by using the object determination threshold adapted to the road surface condition. Therefore, it becomes possible to detect an object while suppressing an influence of noise resulting from a road surface and suppressing a detection performance decrease.

Moreover, the object determination threshold is calculated based on the output of the LPF 13 to which the reflected wave received by the receiving circuit 12 via the transceiver 10 is inputted. Thus, this calculation of the object determination threshold does not require an onboard camera that images a road surface and the cost for calculating the object determination threshold can be reduced. As a result, while suppressing a cost increase and a detection performance decrease, it is possible to detect an object without being influenced by noise resulting from road surface reflection.

The controller 19 may be configured to prohibit the LPF 13 from operating when a speed of the vehicle is larger than or equal to a predetermined speed (also referred to hereinafter as a third modification). The controller 19 may specify the speed of the vehicle by acquiring a signal of a vehicle speed sensor via an in-vehicle network, an ECU etc. The above predetermined speed may be a speed in such a high speed range that because of an influence of Doppler shift, the noise resulting from the road surface reflection becomes small. For example, the above predetermined speed may be 60 km/h or the like. In the third modification, the threshold calculation part 15 may not add the reference value to the output of the LPF 13 so that this reference value is calculated as the object determination threshold.

Under a condition that the noise resulting from the road surface reflection is small, it is conceived that the necessity of strictly calculating the object determination threshold based on the output after passage of the LPF 13 is low. Therefore, the configuration of the third modification has an advantage of cutting down processes that are not largely required under a condition that the noise resulting from the road surface reflection is small.

Second Embodiment

Although the first embodiment has been illustrated above, embodiments of the present disclosure are not limited to the first embodiment. The following second embodiment is in embodiments of the present disclosure. In the below, the second embodiment will be illustrated with reference to the drawings. For descriptive purpose, parts having the same functions as those illustrated in the first embodiment and the drawings are assigned the same references and explanations on these are omitted.

Figure 5:
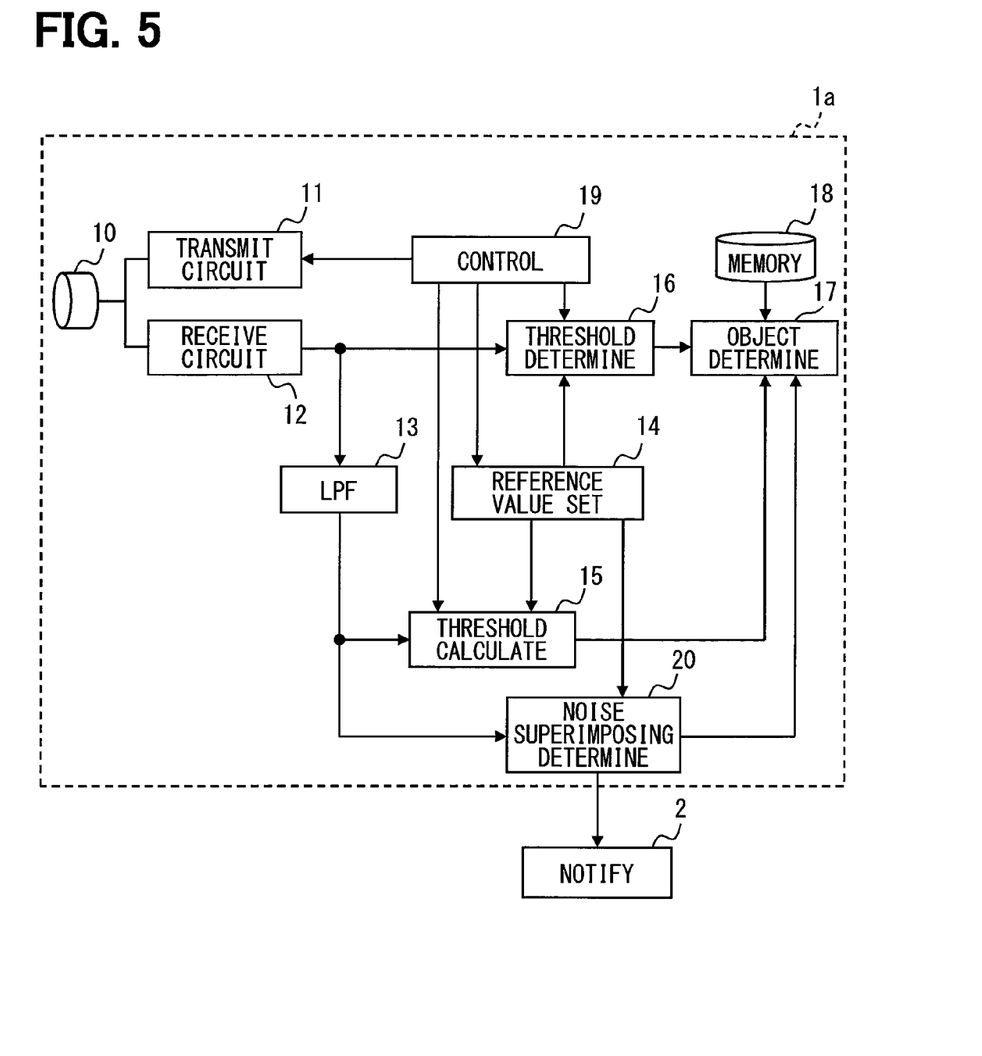
FIG. 5 is a block diagram illustrating a schematic configuration of an object detection apparatus according to a second embodiment.

An object detection apparatus 1a of the second embodiment is similar to the object detection apparatus 1 of the first embodiment, except that that the object detection apparatus 1a includes a noise superimposition determination part 20 and the processing of the object determination part 17 differs in part.

As shown in FIG. 5, the object detection apparatus 1a includes a transceiver 10, a transmitting circuit 11, a receiving circuit 12, a LPF 13, a reference value setting part 14, a threshold calculation part 15, a threshold determination part 16, an object determination part 17, a memory 18, a controller 19, and a noise superimposition determination part 20.

The noise superimposition determination part 20 calculates a difference between the output of the LPF 13 and the reference value set by the reference value setting part 14. For example, the difference is calculated by subtracting the reference value from the output of the LPF 13. When the calculated difference is larger than a pre-designated value, it is determined that the noise larger than or equal to a pre-designated value is superimposed. When the calculated difference is smaller than or equal to the pre-designated value, it is determined that the noise larger than or equal to the pre-designated value is not superimposed. The noise superimposition determination part 20 transmits a determination result to the object determination part 17 and the notifier 2.

The pre-designated value is set in advance and arbitrarily settable. For example, the pre-designated value may be set to such a noise value in which the calculated object determination threshold makes it difficult for the object determination part 17 to accurately determine the presence and absence of an object.

The object determination part 17 performs the same processes as those in the first embodiment. Additionally, for example, upon receipt of the determination result that the noise larger than or equal to the pre-designated value is superimposed from the noise superimposition determination part 20, the object determination part 17 temporarily stops determining a presence and absence of an object. After temporarily stopping determining a presence and absence of an object, when the object determination part 17 receives the determination result that the noise larger than or equal to the pre-designated value is not superimpose from the noise superimposition determination part 20, the object determination part 17 restarts determining a presence and absence of an object.

In this configuration, when there is a noise that makes it difficult to accurately determine the presence and absence of an object, the determination of the presence and absence of an object by the object determination part 17 is stopped. Thus, a wrong determination is prevented.

The notifier 2 is a display, a speech output device or the like, and gives, for example, warning or the like when receiving the determination result that the noise larger than or equal to the pre-designated value is superimposed from the noise superimposition determination part 20. Examples include giving warning indicating that the noise is large, warning indicating the presence and absence of an object cannot be determined, and the like. Either the temporary stop of the determination of the object determination part 17 or the warning of the notifier 2 may be implemented.

Because the second embodiment includes the same configuration as the first embodiment, the second embodiment has the same technical effects as the first embodiment. Additionally, the second embodiment is combinable with the first modification, the second modification and the third modification.

Third Embodiment

Although the first and second embodiments have been illustrated above, embodiments of the present disclosure are not limited to the first and second embodiments. The following third embodiment is in embodiments of the present disclosure. In the below, the third embodiment will be illustrated with reference to the drawings. For descriptive purpose, parts having the same functions as those illustrated in the first and second embodiments and the drawings are assigned the same references and explanations on these are omitted.

Figure 6:
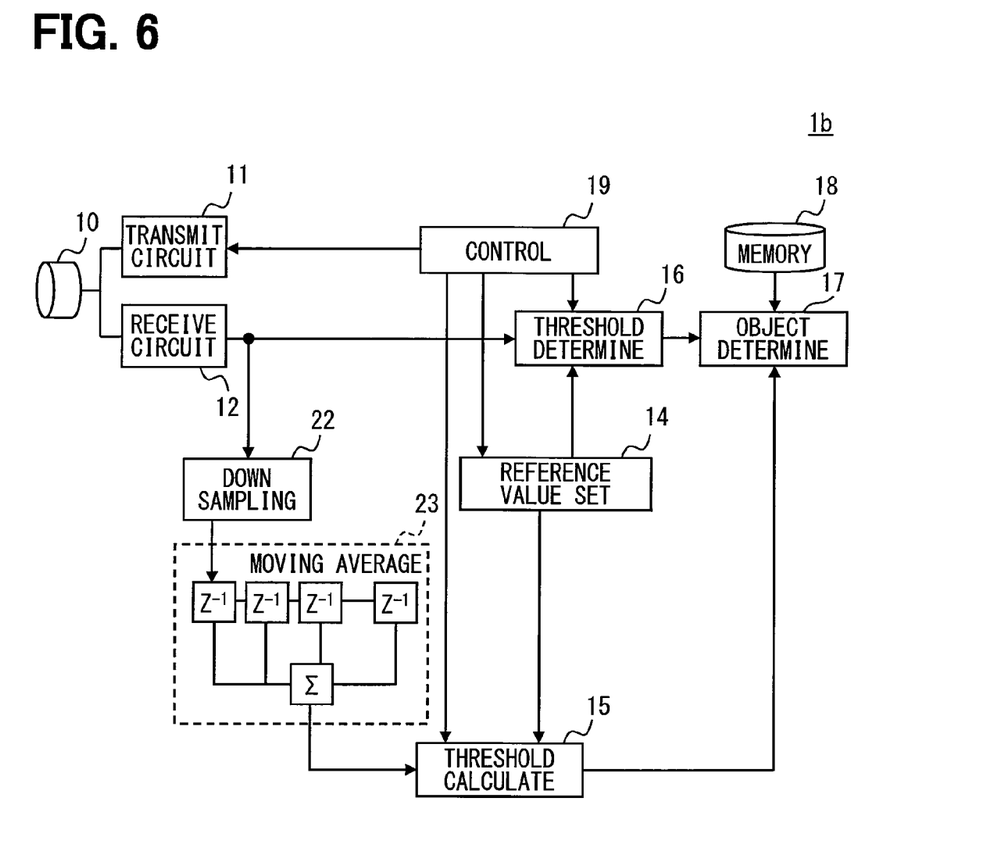
FIG. 6 is a block diagram illustrating a schematic configuration of an object detection apparatus according to a third embodiment.

An object detection apparatus 1b of the third embodiment is similar to the object detection apparatus 1 of the first embodiment, except that that the object detection apparatus 1b includes a down sampling part 22 and a moving average part 23. In the third embodiment, a configuration of the first embodiment that uses the output of the LPF 13 is replaced with a configuration that uses an output after the down sampling part 22 and the moving average part 23.

As shown in FIG. 6, the object detection apparatus 1b includes a transceiver 10, a transmitting circuit 11, a receiving circuit 12, a reference value setting part 14, a threshold calculation part 15, a threshold determination part 16, an object determination part 17, a memory 18, a controller 19, a down sampling part 22, and a moving average part 23. The down sampling part 22 and the moving average part 23 correspond to an example of a filter.

The down sampling part 22 performs down sampling in which frequencies of the signal of the reflected wave received by the receiver and outputted from the receiving circuit 12 are decreased to smaller than or equal to a predetermined value. The frequencies smaller than or equal to the predetermined value are at least smaller than the frequency of the pulse frequency of the transmitted probe wave and may be smaller than or equal to one third of the pulse frequency of the transmitted probe wave.

The moving average part 23 performs moving average of successive outputs of the down sampling part 22. For example, a simple moving average may be obtained.

In the above, the down sampling and the moving average can reduce an amount of data to be processed. Thus, it becomes possible to improve a processing speed of the object detection apparatus 1b and reduce a processing load.

In term of passing only the frequencies smaller than or equal to the predetermined value, the down sampling part 22 and the moving average part 23 are the same as the LPF 13 of the first embodiment. Therefore, the third embodiment can also have the same technical effects as the first embodiment. The third embodiment is combinable with the first modification, the second modification, the third modification and the second embodiment. When the third embodiment is combined with the first modification, the second modification or the third modification, the output of the LPF 13 may be replaced with the output of the moving average part 23.

Fourth Embodiment

Although the first to third embodiments have been illustrated above, embodiments of the present disclosure are not limited to the first to third embodiments. The following fourth embodiment is in embodiments of the present disclosure. In the below, the fourth embodiment will be illustrated with reference to the drawings. For descriptive purpose, parts having the same functions as those illustrated in the first to third embodiments and the drawings are assigned the same references and explanations on these will be omitted.

Figure 7:
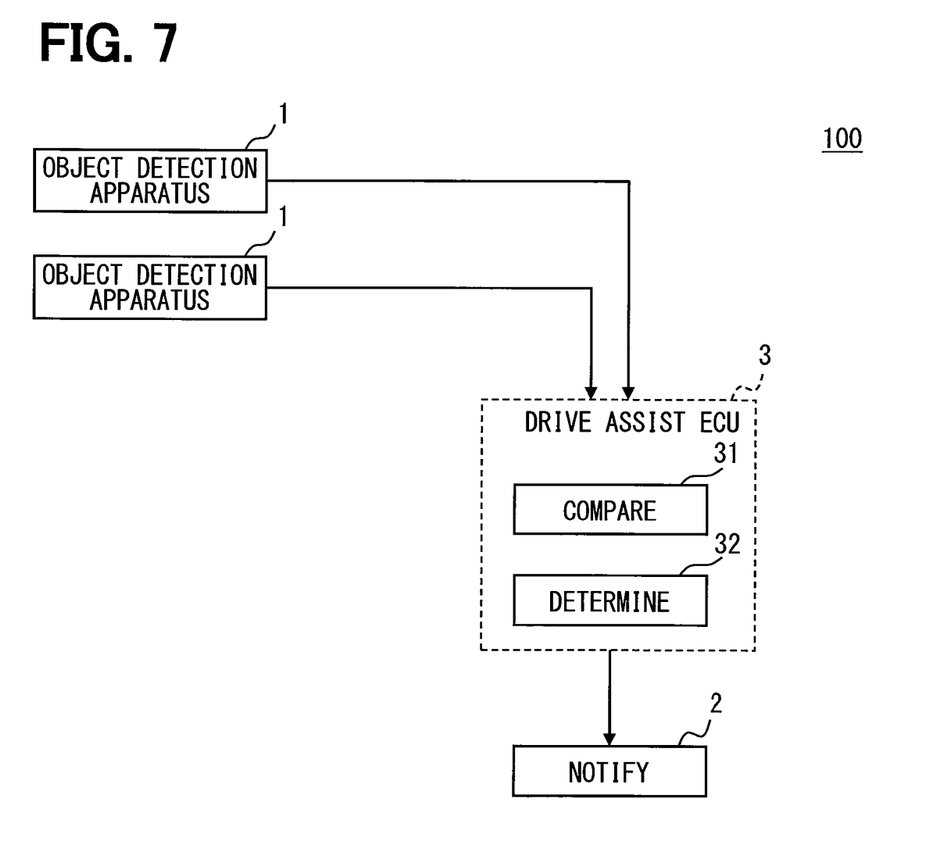
FIG. 7 is a block diagram illustrating a schematic configuration of an object detection system according to a fourth embodiment.

An object detection system 100 of the fourth embodiment is mounted to a vehicle and includes two object detection apparatuses 1, a driving assist ECU 3, and a notifier 2, as shown in FIG. 7. The two object detection apparatuses 1 are mounted to a single vehicle and arranged to, for example, detect objects in different directions. The description in the present embodiment is given for an exemplary case of using the object detection apparatuses 1. However, configurations are not limited to this. The object detection apparatus 1a or the object detection apparatus 1b may be used.

For example, the object detection apparatus 1 may be configured such that a maximum output from the LPF 13 and a determination result of the object determination part 17 are transmitted to the driving assist ECU 3.

The driving assist ECU 3 is provided with a typical computer and includes therein a CPU, a memory such as a ROM, a RAM, an EEPROM or the like, an IO, a bus line connecting these component, and the like (each not shown), which are well-know. Based on various information inputted from the object detection apparatus 1, the driving assist ECU 3 performs various processes. In doing so, the CPU executes programs pre-stored in the ROM. As shown in FIG. 7, the driving assist ECU 3 includes a comparison part 31 and a determination part 32 as functional blocks.

The comparison part 31 makes a comparison between the outputs of the LPFs 13 of the two object detection apparatuses 1 and calculates an output difference. The determination part 32 determines the noise resulting from the road surface reflection when the output difference calculated by the comparison part 31 is within a predetermined range, and determines a foreign noise other than the noise resulting from the road surface reflection when the output difference calculated by the comparison part 31 is out of the predetermined range.

The foreign noise refers to noise other than the road surface reflection, and may be probe wave from a similar system in a different vehicle, ultrasonic wave generated by air braking of a truck etc. The predetermined range is a range that can be regarded as substantially a same degree such as a degree of error for example. This is took into consideration that the respective obstacle detection apparatuses 1 have substantially the same degree of the noise resulting from the road surface reflection but do not have substantially the same degree of the foreign noise.

When the noise resulting from the road surface reflection is determined by the determination part 32, the determination part 32 transmits the determination result of the object detection apparatus 1 to the notifier 2. For example, when receiving the determination result of the object detection apparatus 1, the notifier 2 may notify that an object is present within a detection range of the object detection apparatus 1 that has determined the presence of the object (that is, has detected the object).

When the foreign noise is determined multiple times in row by the determination part 32, the determination part 32 causes the notifier 2 to give warning. For example, it may be notified that the object detection apparatus 1 is unusable due to the foreign noise. The multiple times may be arbitrarily settable and may be, for example, two times.

Alternatively, when the foreign noise is determined multiple times in row by the determination part 32, the determination part 32 may cause the object detection apparatus 1 to temporarily stop determining a presence and absence of an object. After the object detection apparatus 1 temporarily stops determining a presence and absence of an object, the determination part 32 may cause the object detection apparatus 1 to restart determining a presence and absence of an object when the foreign noise is not determined.

In this configuration, when the influence of the foreign noise makes it difficult to accurately determine a presence and absence of an object, it becomes possible to notify a user of this and prevent a wrong determination by temporarily stopping making the determination.

The notification of the notifier 2 and the temporary stop of the determination of the object detection apparatus 1 may be performed for all of the objection detection apparatuses 1 in the object detection system 100 or may be performed for part of the objection detection apparatuses 1. When this is performed for part of the objection detection apparatuses 1, this may be performed for only apparatus that has a larger output of the LPF 13.

Although two object detection apparatuses 1 is included in the object detection system 100 in the present embodiment, configurations are not limited to this. For example, the object detection system 100 may include three or more object detection apparatuses 1.

In this case, the comparison part 31 may calculate an output difference for each combination of the LPFs 13 of the three or more object detection apparatuses 1 and the determination part 32 may make the determination for the output difference for each combination. The above-described notification and the temporary stop of the determination may be performed for that object detection apparatuses 1 corresponding to a combination for which the foreign noise is determined multiple times in row by the determination part 32. The above-described notification of the notifier 2 and temporary stop of the determination of the object detection apparatus 1 may be performed for, among the combination for which the foreign noise is determined multiple times in row by the determination part 32, only one that has a larger output of the LPF 13.

Because the fourth embodiment includes the configuration of the first embodiment, the forth embodiment can also have the same technical effects as the first embodiment. The fourth embodiment is combinable with the first modification, the second modification, the third modification, the second embodiment, and the third embodiment.

Embodiments of the present disclosure are not limited to respective embodiments illustrated above, and can be modified in various ways. For example, embodiments obtained by appropriately combining technical parts disclosed in different embodiments are also within the scope of embodiments of the present disclosure.

The invention claimed is:

1. An object detection apparatus mounted to a vehicle, comprising:
   a transmitter that transmits a probe wave in pulse form;
   a receiver that receives a reflected wave of the probe wave;
   a filter that passes, among the received reflected wave, only frequencies that are at least smaller than a pulse frequency of the probe wave;
   a threshold calculator that, based on an output of the filter, calculates an object determination threshold for determining presence and absence of an object; and
   an object determinator that determines the presence and absence of the object by using the object determination threshold calculated by the threshold calculator.

2. The object detection apparatus according to claim 1, wherein
   the filter passes only frequencies smaller than or equal to one third of the pulse frequency of the probe wave.

3. The object detection apparatus according to claim 1, wherein
   the filter includes:
   a down sampling part that performs down sampling in which the frequencies of the reflected wave received by the receiver are decreased to at least smaller than or equal to the pulse frequency of the probe wave; and
   a moving average part that performs moving average of successive outputs of the down sampling part.

4. The object detection apparatus according to claim 1, wherein the threshold calculator calculates the object determination threshold by adding a predetermined reference value to the output of the filter.

5. The object detection apparatus according to claim 4, wherein
   the reference value is a dark noise level of the output of the filter, the dark noise level being a noise level obtained when the probe wave is not transmitted by the transmitter.

6. The object detection apparatus according to claim 4, further comprising:
   an operation controller that controls an operation of the filter, wherein
   when a speed of the vehicle is larger than or equal to a predetermined speed, the operation controller prohibits the filter from operating and the threshold calculator calculates, as the object determination threshold, the reference value to which the output of the filter is not added.

7. The object detection apparatus according to claim 4, further comprising:
   a noise superimposition determinator that, when a difference between the output of the filter and the reference value is larger than a pre-designated value, determines that a noise larger than or equal to a preset value is superimposed.

8. The object detection apparatus according to claim 1, wherein the probe wave is ultrasonic wave,
   the object detection apparatus further comprising
   an operation controller that controls an operation of the filter,
   wherein when the transmitter transmits the probe wave, the operation controller causes the filter to operate after elapse of a reverberation time of the transmission of the probe wave.

9. An object detection system comprising:
   a plurality of the object detection apparatuses recited in claim 1 and mounted to a single vehicle.

10. The object detection system according to claim 9, further comprising:
    a comparator that makes a comparison between the outputs of the filters of the plurality of object detection apparatuses; and
    a determinator that determines a road surface reflection noise when a difference between the outputs, which is obtained from the comparison of the comparator, is within a predetermined range, and
    determines a foreign noise other than the road surface reflection noise when the difference between the outputs, which is obtained from the comparison of the comparator, is out of the predetermined range.

11. The object detection system according to claim 10, further comprising:
    a notifier that notifies that the object detection apparatus is unusable due to the foreign noise when the foreign noise is determined a plurality of times in row by the determinator, wherein the plurality of times is predetermined.

12. The object detection apparatus according to claim 1, wherein:
    the transmitter transmits the probe wave in the pulse form by oscillating a probe wave transmission member predetermined times at a predetermined frequency;
    the filter passes, among the received reflected wave, only the frequencies that are smaller than at least the pulse frequency of the single probe wave, the single probe wave being formed by oscillating the probe wave transmission member the predetermined times at the predetermined frequency, the pulse frequency being different from the predetermined frequency; and
    the object determinator determines the presence and absence of the object by using the object determination threshold calculated by the threshold calculator and a peak value of the reflected wave received with the receiver.

13. The object detection apparatus according to claim 1, wherein:
- the filter includes a low pass filter which passes, among the received reflected wave, only the frequencies that are smaller than at least the pulse frequency of the probe wave; and
- the object determinator that determines the presence and absence of the object by comparing the object determination threshold calculated by the threshold calculator with the reflected wave received with the receiver.

* * * * *